(12) United States Patent
Lewis et al.

(10) Patent No.: US 9,756,393 B2
(45) Date of Patent: Sep. 5, 2017

(54) RECORDING OPTION FOR ADVERTISED PROGRAMS

(71) Applicant: AT&T Intellectual Property I, LP, Atlanta, GA (US)

(72) Inventors: Stephanie Lewis, Dacula, GA (US); Jennifer Portanka, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/447,755

(22) Filed: Jul. 31, 2014

(65) Prior Publication Data

US 2016/0037222 A1 Feb. 4, 2016

(51) Int. Cl.
*H04N 21/472* (2011.01)
*H04N 21/482* (2011.01)
*H04N 21/433* (2011.01)
*H04N 21/4227* (2011.01)
*H04N 21/4363* (2011.01)
*H04N 21/81* (2011.01)

(52) U.S. Cl.
CPC ... *H04N 21/47214* (2013.01); *H04N 21/4227* (2013.01); *H04N 21/4334* (2013.01); *H04N 21/43637* (2013.01); *H04N 21/482* (2013.01); *H04N 21/812* (2013.01)

(58) Field of Classification Search
None
See application file for complete search history.

(56) References Cited

U.S. PATENT DOCUMENTS

| 5,589,892 | A | 12/1996 | Knee et al. |
| 6,002,394 | A | 12/1999 | Schein et al. |
| 6,177,931 | B1 | 1/2001 | Alexander |
| 6,275,268 | B1 | 8/2001 | Ellis et al. |

(Continued)

OTHER PUBLICATIONS

"Instant Gratification", HSN Shop by Remote, http://www.hsn.com/Article/shop-by-remote/3803, May 22, 2014, 1 page.

(Continued)

*Primary Examiner* — Nathan Flynn
*Assistant Examiner* — Christine Kurien
(74) *Attorney, Agent, or Firm* — Guntin & Gust, PLC; Jay H. Anderson

(57) ABSTRACT

Aspects of the subject disclosure may include, for example, a media processor displaying an advertisement regarding a future media presentation and determining an identifier and a communication capability of a mobile device associated with a subscriber associated with a remote second media processor. The media processor establishes communication with the mobile device in accordance with the communication capability, receives a first signal from the mobile device indicating that recording of an advertised future media presentation is desired, and displays a first menu in response to the first signal, where the first menu comprises an identifier of the future media presentation and identifiers of additional future media presentations advertised previously. The media processor also receives a second signal from the mobile device indicating selection from the first menu of a future presentation to be recorded, and transmits an instruction via the network to record the selected presentation. Other embodiments are disclosed.

20 Claims, 10 Drawing Sheets

(56) References Cited

U.S. PATENT DOCUMENTS

| | | | |
|---|---|---|---|
| 6,363,440 B1 | 3/2002 | Stepp et al. | |
| 6,418,556 B1 | 7/2002 | Bennington et al. | |
| 7,159,232 B1* | 1/2007 | Blackketter | H04N 5/44513 |
| | | | 348/E5.102 |
| 7,543,325 B2 | 6/2009 | Westbrook et al. | |
| 7,665,111 B1 | 2/2010 | Barton et al. | |
| 7,716,709 B2 | 5/2010 | Liebenow | |
| 7,870,587 B2 | 1/2011 | Ellis et al. | |
| 8,032,914 B2 | 10/2011 | Rodriguez | |
| 8,434,103 B2 | 4/2013 | Tsuchida et al. | |
| 8,561,113 B2 | 10/2013 | Cansler, Jr. et al. | |
| 8,615,782 B2 | 12/2013 | Schein et al. | |
| 8,732,757 B2 | 5/2014 | Ward et al. | |
| 8,732,765 B2 | 5/2014 | Ellis et al. | |
| 8,924,999 B1* | 12/2014 | Santangelo | H04N 21/25875 |
| | | | 725/10 |
| 2005/0028208 A1* | 2/2005 | Ellis | H04N 7/163 |
| | | | 725/58 |
| 2006/0041910 A1* | 2/2006 | Hatanaka | H04N 5/765 |
| | | | 725/58 |
| 2007/0157281 A1* | 7/2007 | Ellis | H04N 7/17309 |
| | | | 725/134 |
| 2008/0235725 A1 | 9/2008 | Hendricks | |
| 2008/0235731 A1* | 9/2008 | Bryant | H04N 5/44543 |
| | | | 725/44 |
| 2009/0094661 A1 | 4/2009 | Boger | |
| 2011/0078717 A1* | 3/2011 | Drummond | H04N 21/4586 |
| | | | 725/14 |
| 2012/0017243 A1 | 1/2012 | Reynolds et al. | |
| 2012/0027383 A1* | 2/2012 | Barton | G11B 27/034 |
| | | | 386/248 |

OTHER PUBLICATIONS

"Interactive TV (iTV)", http://xfinity.comcast.net/newguide/, May 21, 2014, 4 pages.

\* cited by examiner

100

500

600

RECORDING OPTION FOR ADVERTISED PROGRAMS

FIELD OF THE DISCLOSURE

The subject disclosure relates to a system and method for scheduling recording of an advertised program.

BACKGROUND

A viewer can schedule his own digital video recorder (DVR) to record a program that is listed in his electronic program guide. While watching a live or recorded presentation, a viewer may wish to order a recording of that program for his own use, even if that viewer is remote from his DVR and does not have access to his electronic program guide.

BRIEF DESCRIPTION OF THE DRAWINGS

Reference will now be made to the accompanying drawings, which are not necessarily drawn to scale, and wherein.

DETAILED DESCRIPTION

Figure 1:
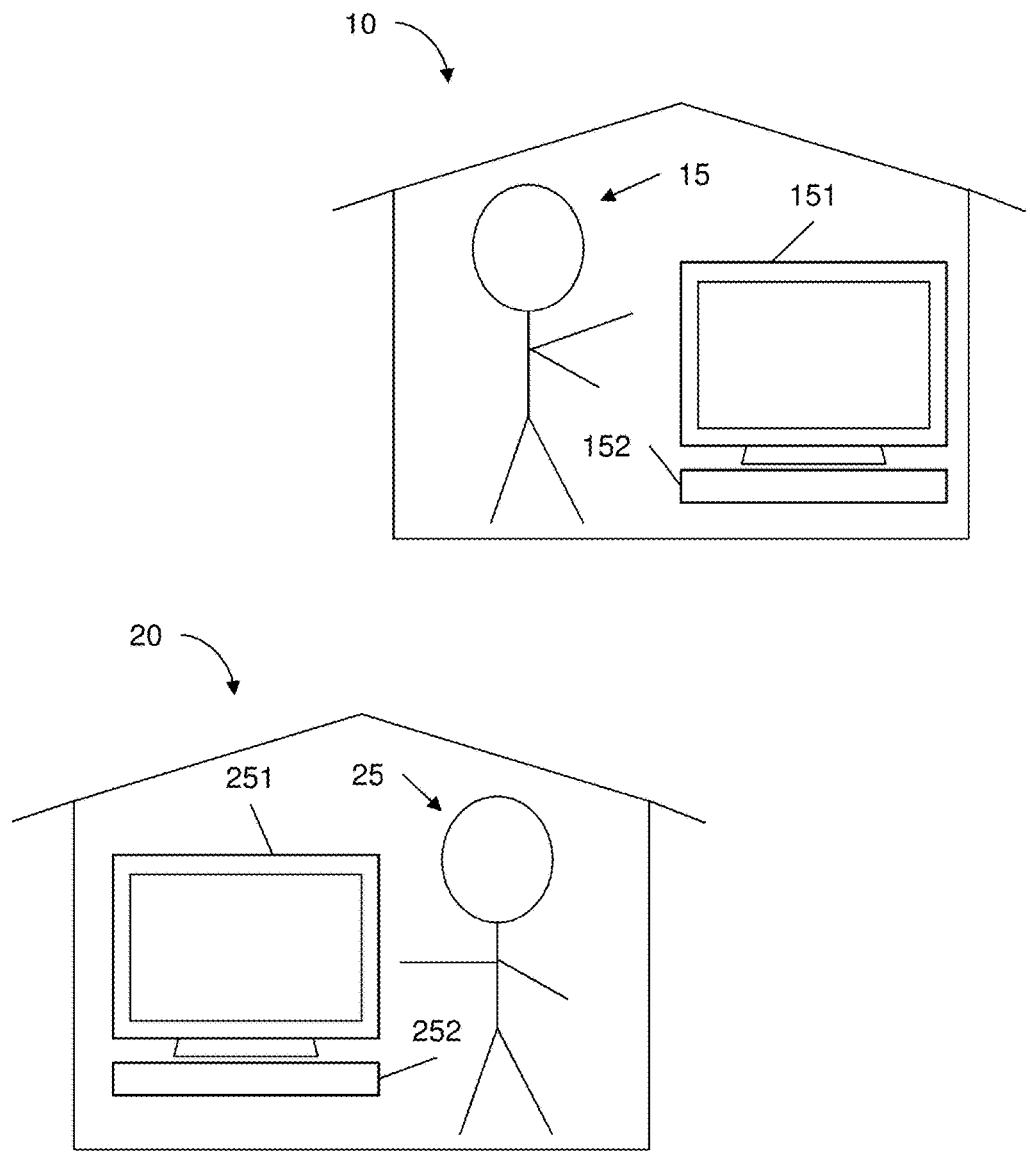
FIG. 1 depicts an illustrative embodiment in which network subscribers have equipment at separate locations.

The subject disclosure describes, among other things, illustrative embodiments for a system for scheduling recording of an advertised program (for example, a program being advertised on a commercial while a user is watching a live television program), or for taking some other action in response to an advertisement or other message. Other embodiments are described in the subject disclosure.

One or more aspects of the subject disclosure include using a mobile communication device to communicate with a local media processor separate from a remote media processor associated with the user of the mobile device. The user of the mobile device can select a program to be recorded by the remote media processor, and/or select additional locations at which the program is to be recorded.

One embodiment of the subject disclosure includes a media processor communicating over a network and comprising a memory to store instructions and a controller coupled to the memory. The controller, responsive to executing the instructions, performs operations comprising displaying, on a display device associated with the media processor, an advertisement regarding a future media presentation. The operations also comprise determining an identifier of a mobile device and a communication capability of the mobile device; the mobile device is associated with a subscriber to the network, and the subscriber is associated with a remote second media processor communicating over the network. The operations also comprise initiating communication with the mobile device without using the network and in accordance with the communication capability, and receiving a first signal from the mobile device indicating that recording of an advertised future media presentation is desired. The operations further comprise providing a first menu in response to the first signal, where the first menu comprises future media presentations advertised currently or within a previous time period, the first menu being arranged with a most recently advertised future media presentation at a first position in the first menu and indicated as a default selection. The operations also comprise receiving a second signal from the mobile device indicating selection from the first menu of a future media presentation to be recorded, and transmitting an instruction via the network to record the selected future media presentation.

One embodiment of the subject disclosure includes a computer-readable storage device comprising executable instructions which, when executed by a processor, cause the processor to perform operations. The operations comprise displaying, on a display device associated with a first set top box utilizing the processor, an advertisement regarding a future media presentation; the first set top box is associated with a first subscriber. The operations also comprise obtaining an identifier of a mobile device associated with a second subscriber; the second subscriber is associated with a remote second set top box and not the first set top box. The operations further comprise initiating communication with the mobile device using short-range communication, receiving a first signal from the mobile device indicating that recording of an advertised future media presentation is desired, and providing a first menu in response to the first signal, where the first menu comprises future media presentations advertised currently or within a previous time period. The operations also comprise receiving a second signal from the mobile device indicating selection from the first menu of a future media presentation to be recorded, and transmitting an instruction to remotely record the selected future media presentation.

One embodiment of the subject disclosure includes a method comprising displaying, by a first media processor on a display device associated with the first media processor, an advertisement regarding a future media presentation, the first media processor being associated with a first subscriber. The method also comprises determining, by the first media processor, an identifier of a mobile device, the mobile device being associated with a second subscriber different from the first subscriber, the second subscriber being associated with a second media processor remotely located from the first media processor. The method also comprises initiating communication with the mobile device, receiving a first signal from the mobile device regarding recording of an advertised future media presentation, and providing a first menu in response to the first signal, where the first menu comprises an identifier of the future media presentation and identifiers of other future media presentations advertised previously. The method further comprises receiving a second signal from the mobile device indicating selection from the first menu, and transmitting an instruction to record a selected future media presentation.

FIG. 1 depicts an illustrative embodiment 100 in which two network subscribers 15, 25 control media processing and display equipment at their respective premises 10, 20. Specifically, subscriber 15 controls media processor 152 which is connected to display device 151, while subscriber 25 controls media processor 252 which is connected to display device 251. As shown in FIG. 1, the two premises and sets of equipment are remote from each other (that is, a remote control device held by subscriber 15 can operate devices 151, 152 but not 251 or 252, and vice versa), and neither subscriber is associated with the equipment of the other.

Figure 2:
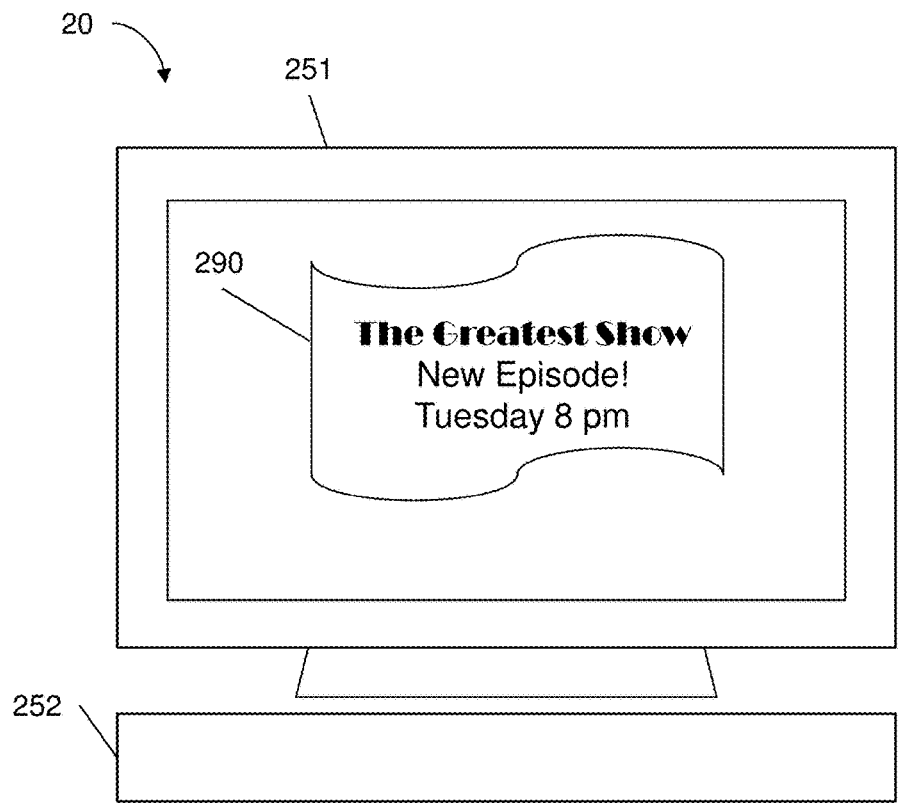
FIG. 2 depicts an illustrative embodiment of the disclosure, in which a subscriber visits a remote location.
Figure 2:
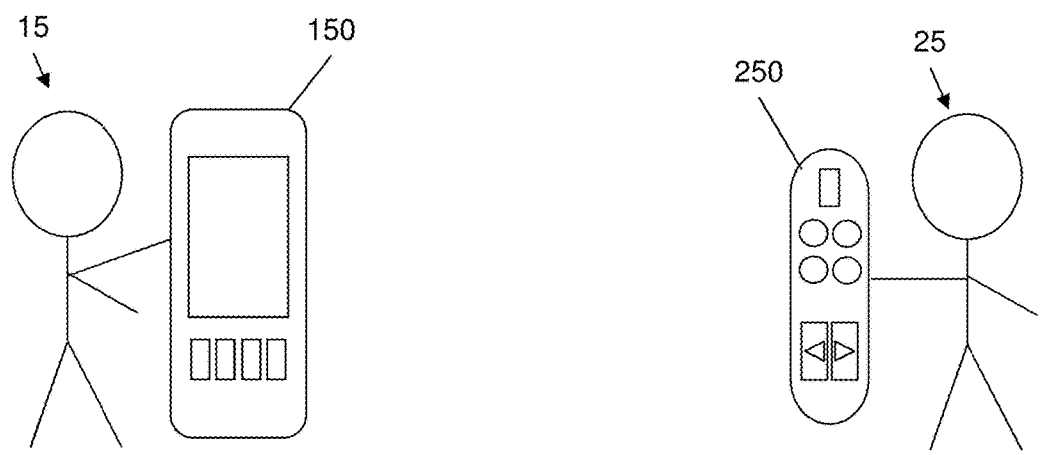

FIG. 2 depicts an illustrative embodiment 200 of the disclosure, in which subscriber 15 visits premises 20. Subscriber 25 can use remote control 250 to operate media processor 252 and display device 251. In this embodiment, subscriber 15 can use his mobile communication device 150 to communicate with media processor 252, in order to schedule recording of a program by media processor 152. In this embodiment, an advertisement 290 is displayed on display device 251, displaying the name of the future presentation and the time that it will be shown.

Figure 3:
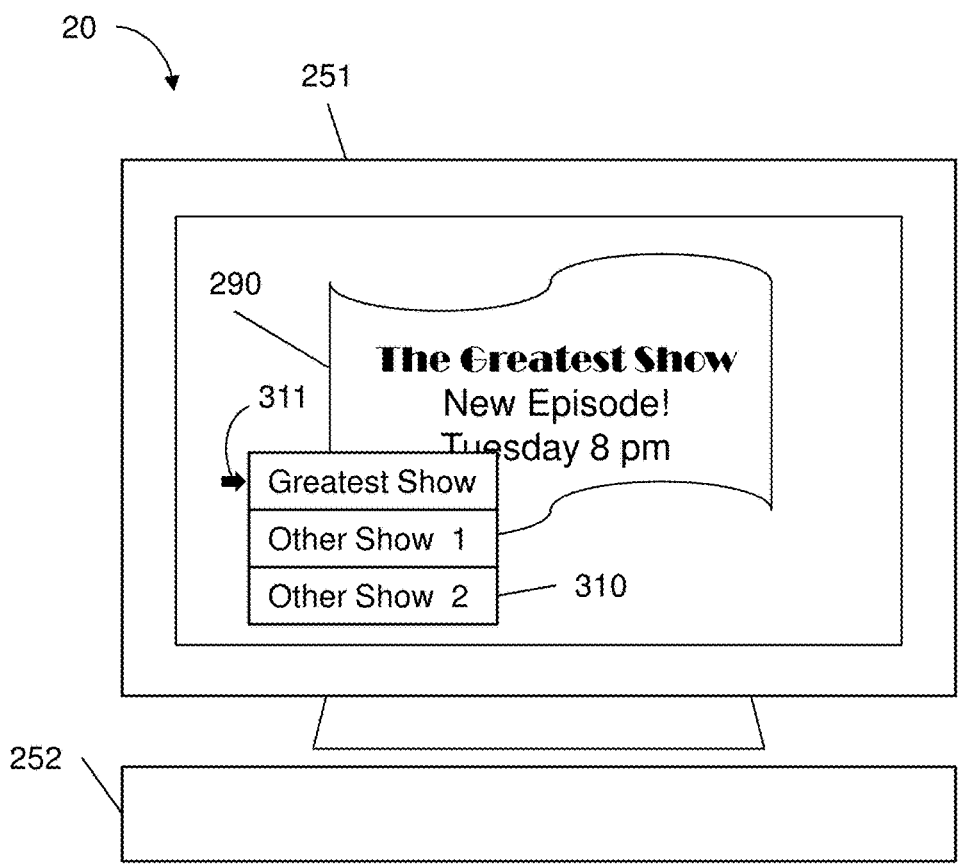
FIG. 3 depicts an illustrative embodiment of the disclosure, in which the visiting subscriber of FIG. 2 schedules recording of an advertised presentation.

FIG. 3 depicts an illustrative embodiment 300 with additional features, in which subscriber 15 (the subscriber visiting premises 20 of subscriber 25) requests a recording of an advertised future presentation. In this embodiment, media processor 252 can detect the presence of mobile communication device 150, identify device 150 as belonging to a subscriber to the network, and determine the communication capabilities of device 150. Media processor 252 can then establish communication with device 150 using a short-range communication protocol (Bluetooth, NFC, or the like). This communication between media processor 252 and device 150 does not, by itself, involve communication over the subscribers' network. Media processor 252 can be configured to communicate according to several different short-range protocols, so that it can communicate with a variety of subscriber mobile devices.

Subscriber 15, viewing the advertisement 290, causes a signal 320 to be transmitted from device 150 to media processor 252. Signal 320 alerts media processor 252 that recording of a presentation is desired. Media processor 252 then provides a menu 310 of future presentations on display 251. In this embodiment, menu 310 lists the future presentations that were recently advertised (in reverse chronological order of the advertisement). In this example, advertisement 290 is still showing on display 251. Accordingly, the title of the advertised presentation is listed in the first position of menu 310, and is also indicated by a pointer 311 (alternatively, by highlighting, display in a contrasting color, etc.). The presentation currently being advertised is thus listed as the default selection on the menu.

In this embodiment, if a recording of the presentation in advertisement 290 is desired, subscriber 15 need not make any further selection. If media processor 252 does not receive another signal within some convenient time period (for example, 6 seconds), media processor 252 interprets signal 320 as a request to schedule a recording of the currently advertised program.

If recording of another presentation listed in menu 310 (instead of, or in addition to, the default presentation) is desired, subscriber 15 can cause an additional signal 330 to be transmitted to media processor 252. Media processor 252 interprets signal 330 as a request to schedule recording of selected presentation(s) listed in menu 310. In an embodiment, device 150 can mimic remote control 250 by causing pointer 311 to move (thereby indicating selection of a different presentation) or causing an additional pointer to appear (thereby indicating selection of multiple presentations listed in menu 310).

In another embodiment, the menu of future presentations (including menu 310 and pointer 311) may be shown at a user interface of device 150 instead of, or in addition to, being shown on display 251. As shown in FIG. 3, the menu can be reformatted (thus being displayed as menu 315) so that it can be easily read on device 150. In menu 315, the default selection can be indicated by a box 316 drawn around the menu entry, instead of a pointer next to the entry.

Figure 4:
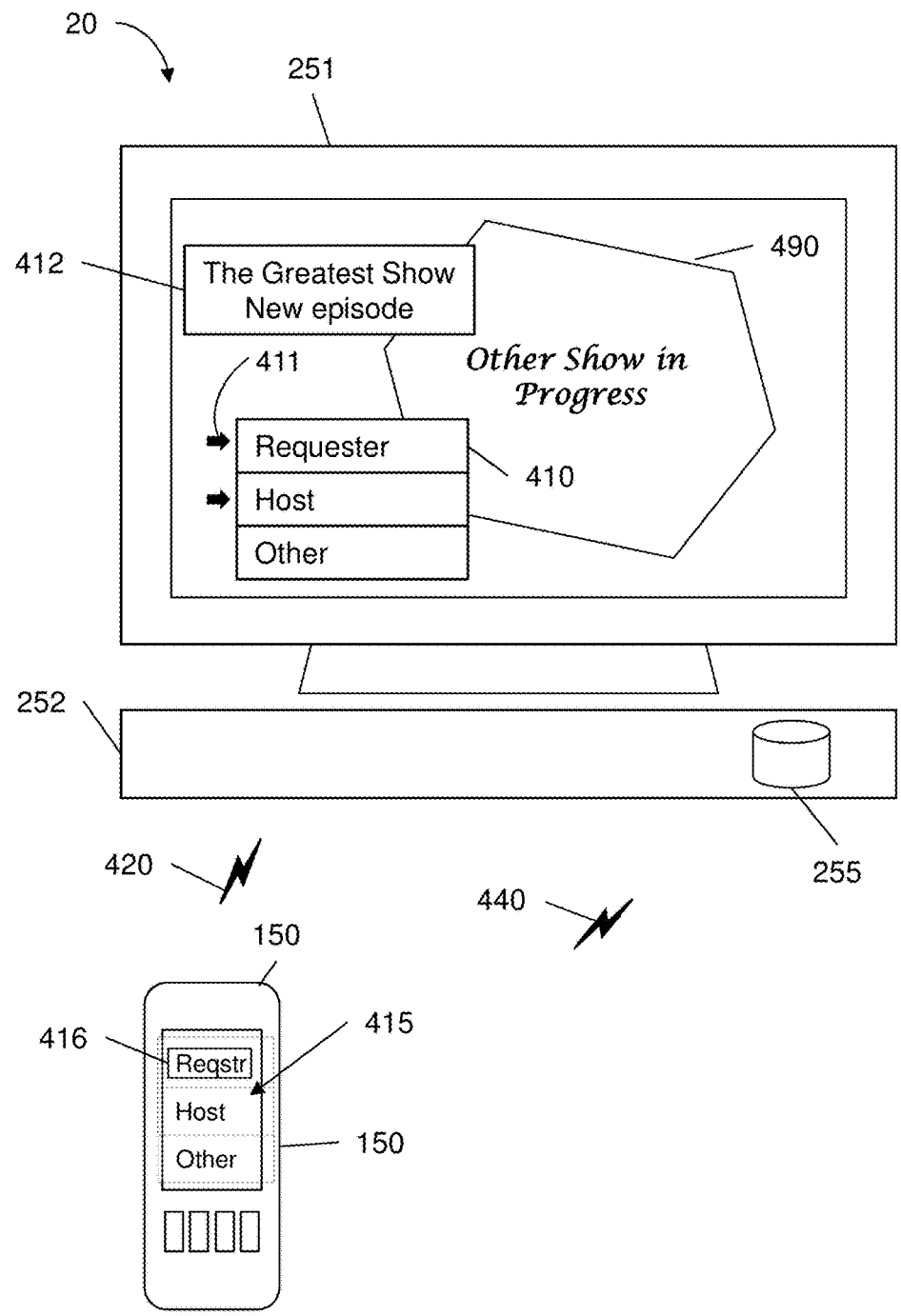
FIG. 4 depicts an illustrative embodiment of the disclosure, in which a location is selected for the scheduled recording of FIG. 3.

After receiving a selection of one or more future presentations from device 150 (which, as noted above, may include the default selection indicated by absence of a signal), media processor 252 provides a menu 410 of possible locations where the desired recording can be performed (as in illustrative embodiment 400 shown in FIG. 4). In this embodiment, menu 410 has at least two entries, corresponding to the recording equipment of the requesting subscriber 15 (that is, media processor 152 at remote premises 10) and the recording equipment of the host subscriber 25 (that is, media processor 252 at local premises 20). Media processor 252 also can be configured to provide additional menu entries corresponding to equipment of other subscribers. These subscribers can be on a list of friends of subscriber 25 that is maintained in a local data storage 255 in media processor 252. In another embodiment, a list of friends of subscriber 15 can be transmitted by a signal 440 from device 150 to media processor 252, displayed in menu 410, and stored in data storage 255. In another embodiment, media processor 252 can transmit the identifier of the mobile device to a network element, and receive from the network element identifiers of a plurality of media processors including the media processor 152. In one embodiment, the network element can be a server remotely located from the media processor 252. Media processor 252 can then provide the identifiers of the plurality of media processors in menu 410.

The default selection of menu 410 (that is, the home media processor 152 of requesting subscriber 15) is listed in the first position of menu 410, and is also indicated by a pointer 411. Media processor 252 optionally may provide a display 412 with information on the presentation(s) selected for recording.

In this embodiment, if recording of the selected future presentation is desired at the requesting subscriber's equipment, the requesting subscriber 15 need not make a further selection. If media processor 252 does not receive another signal within some convenient time period (for example, 6 seconds), media processor 252 interprets the absence of a signal as a request to schedule a recording of the selected presentation at the equipment of subscriber 15 (that is, media processor 152 located at premises 10).

If recording of the selected presentation(s) at equipment of other subscribers listed in menu 410 (instead of, or in addition to, the equipment of requesting subscriber 15) is desired, subscriber 15 can cause an additional signal 420 to be transmitted to media processor 252 with a selection from menu 410. Media processor 252 interprets signal 420 as a request to schedule recording of the selected presentation at equipment of selected subscriber(s) listed in menu 410. In an embodiment, device 150 can further mimic remote control 250 by causing pointer 411 to move (thereby indicating selection of different recording equipment) or causing an additional pointer to appear, as shown in FIG. 4 (thereby indicating selection of multiple subscribers' equipment for recording the selected presentation). Media processor 252 then transmits an instruction via the subscriber network to record the selected future presentations (either currently or previously advertised) at the selected equipment (either remote or local).

In another embodiment, the menu of recording destinations may be shown at a user interface of device 150 instead of, or in addition to, being shown on display 251. As shown in FIG. 4, the menu can be reformatted (thus being displayed as menu 415) so that it can be easily read on device 150. In menu 415, the default location can be indicated by a box 416 drawn around the menu entry, instead of a pointer next to the entry.

As shown in FIG. 4, menu 410 and information 412 can be displayed while a presentation 490 is in progress, after advertisement 290 has concluded. In another illustrative embodiment 500, shown in FIG. 5, media processor does not receive any signal during advertisement 290, but instead receives a signal 520 at some other time (for example, during presentation 490) requesting recording of some future presentation. Media processor 252 responds to signal 520 by providing a menu 510 of future presentations on display 251, listing future presentations that were recently advertised (in reverse chronological order of the advertisement). The title of the most recently advertised presentation is listed in the first position of menu 510, and is also indicated by a pointer 511 (alternatively, by highlighting, display in a contrasting color, etc.). The most recently advertised future presentation is thus listed as the default selection on the menu. In an embodiment, menu 510 lists all of the future presentations advertised within a predetermined time period (for example, within the last five minutes). In another embodiment, menu 510 lists a predetermined number of previously advertised presentations (for example, three presentations as shown in FIG. 5).

Figure 5:
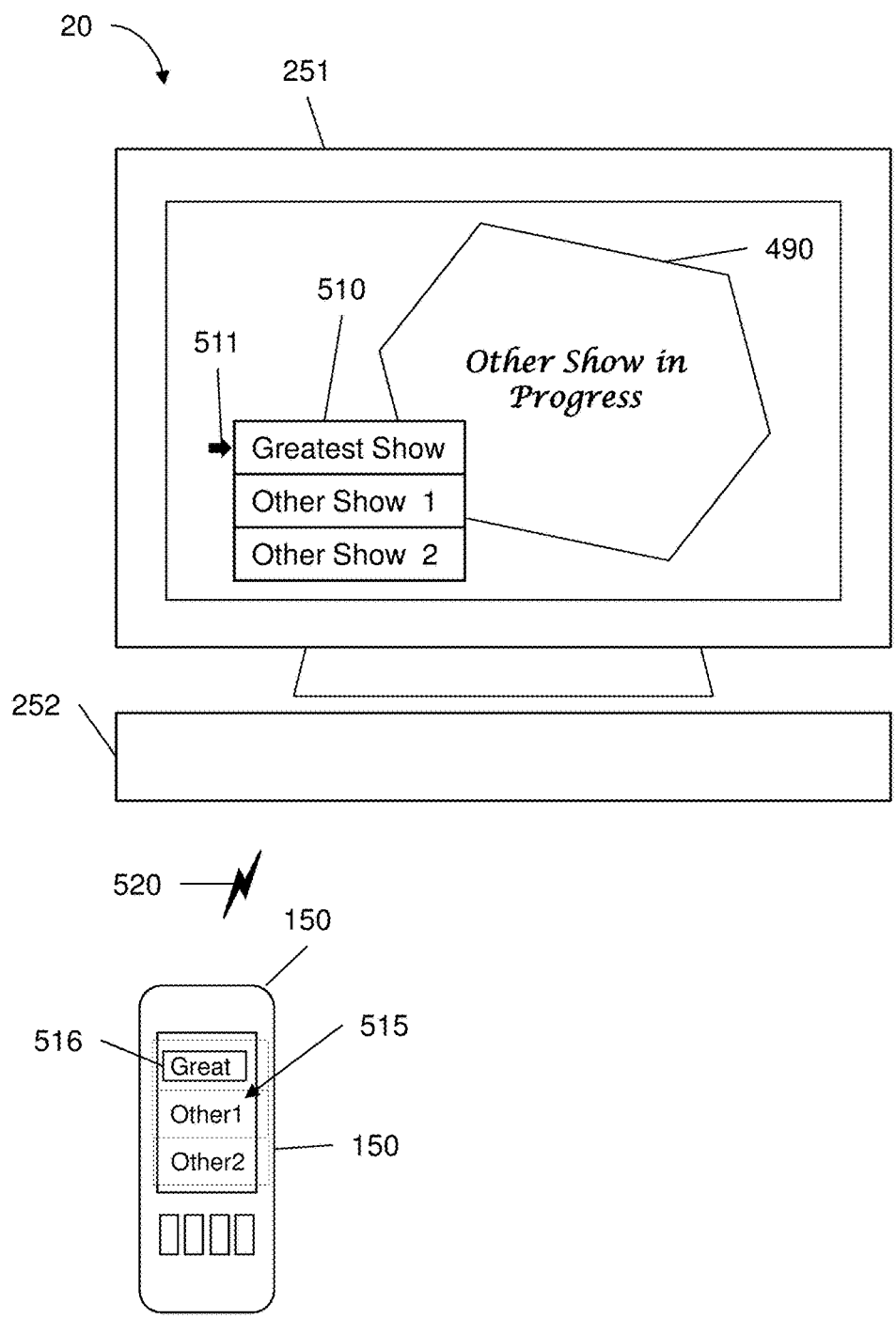
FIG. 5 depicts an illustrative embodiment of the disclosure, in which the visiting subscriber of FIG. 2 schedules recording of a previously advertised presentation.

In a further embodiment, also shown in FIG. 5, the menu of future presentations (including menu 510 and pointer 511) may be shown at a user interface of device 150 instead of, or in addition to, being shown on display 251, as described above with reference to FIG. 3. As shown in FIG. 5, the menu can be reformatted (thus being displayed as menu 515) so that it can be easily read on device 150. In menu 515, the default selection can be indicated by a box 516 drawn around the menu entry, instead of a pointer next to the entry.

Figure 6:
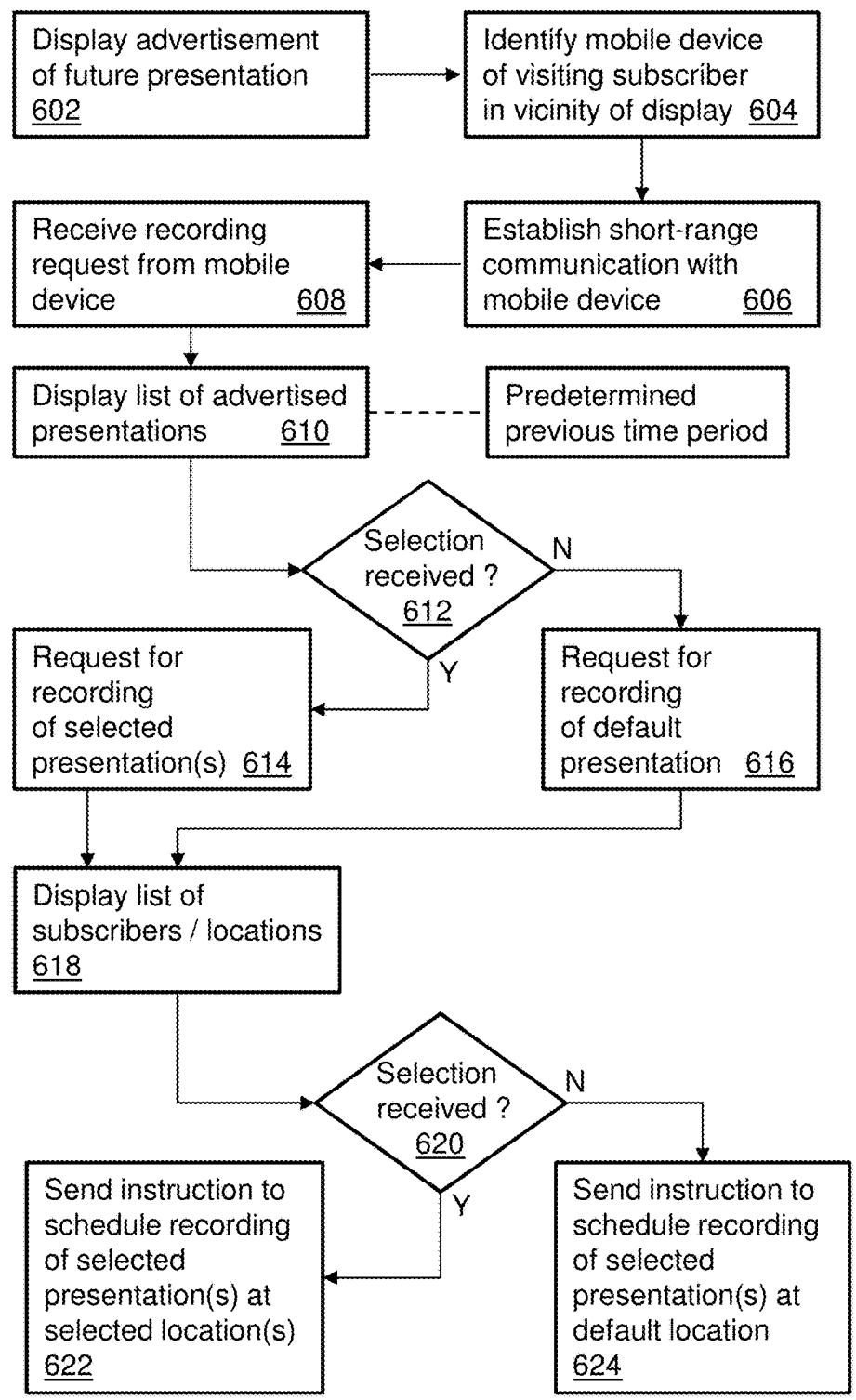
FIG. 6 is a flowchart illustrating a method used in portions of the system described in FIGS. 2-5, in accordance with an embodiment of the disclosure.

FIG. 6 is a flowchart illustrating a procedure 600 for processing requests to record at a remote location, in accordance with an embodiment of the disclosure. In step 602, a media processor associated with a subscriber displays an advertisement of a future presentation. The media processor identifies a mobile device, located nearby but associated with a remotely based subscriber (step 604), and establishes short-range communication with that device (step 606). After short-range communication is established, the media processor receives a request from the mobile device to record an advertised presentation (step 608). A list of presentations is then displayed (step 610); this list includes a currently advertised presentation and can also include presentations advertised previously during a predetermined time period.

A signal from the mobile device indicating selection of an advertised presentation (step 612) is processed in step 614 as a request to schedule a recording of the selected presentation(s), with the location of that recording not yet determined. The absence of a signal from the mobile device is processed as a request to schedule a recording of the default presentation (step 616).

The media processor then displays a list of subscribers or subscriber locations, corresponding to equipment on which the selected recording can be scheduled (step 618). A signal from the mobile device indicating selection of a subscriber or location (step 620) is processed in step 622 as a request to transmit an instruction to schedule recording of the selected presentation(s) at the selected equipment location(s). The absence of a signal from the mobile device is processed as a request to transmit an instruction to schedule a recording of the selected presentation(s) at the default equipment location—that is, the remotely located equipment of the requesting subscriber (step 624).

More generally, subscriber 15 can respond to any message or advertisement directed to subscribers on the network and presented on equipment of subscriber 25, by virtue of the short-range communication between mobile communication device 150 (associated with subscriber 15) and media processor 252 (associated with subscriber 25). In order to respond to an advertisement (for example, schedule a recording of a future presentation), mobile device 150 need not be configured to receive content (the currently presented show 490, the advertisement 290, or the advertised presentation). As discussed above with regard to FIGS. 3-5, menus for selecting a future presentation for recording and the location of that recording can be presented on a display of the visiting subscriber's communication device 150 instead of on the host's display device 251. The visiting subscriber 15 thus can remotely schedule a recording without interfering with the host subscriber 25 viewing content on display 251.

Figure 7:
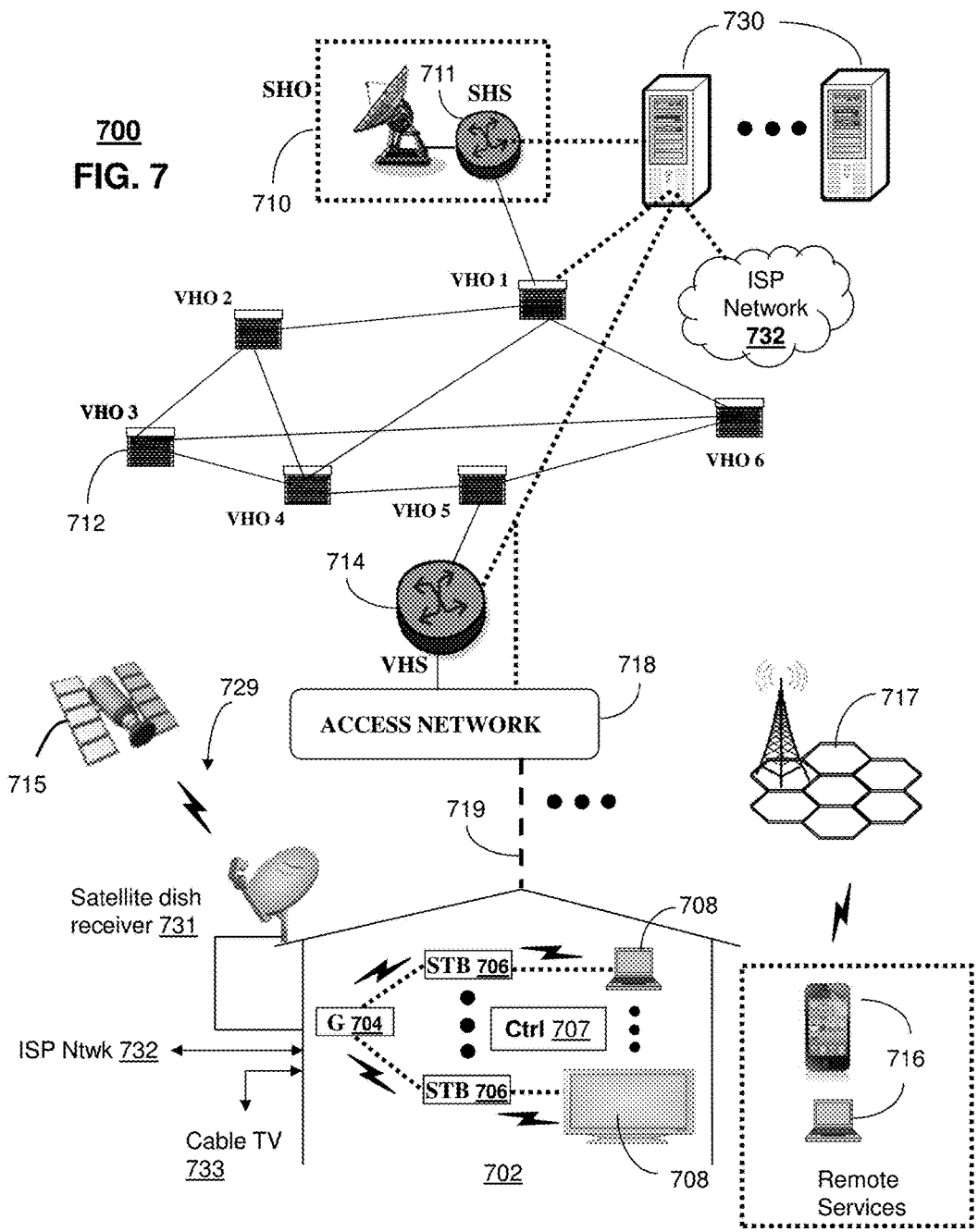
FIGS. 7-8 depict illustrative embodiments of communication systems that provide media services including the advertised presentation of FIG. 3.

FIG. 7 depicts an illustrative embodiment of a first communication system 700 for delivering media content. The communication system 700 can represent an Internet Protocol Television (IPTV) media system. Communication system 700 can be overlaid or operably coupled with the systems shown in FIGS. 1-5 as another representative embodiment of communication system 700. For instance, one or more devices illustrated in the communication system 700 of FIG. 7 can perform the functions of a media processor communicating over a network and comprising a memory to store instructions and a controller coupled to the memory. The processor, responsive to executing the instructions, can perform operations comprising displaying, on a display device associated with the media processor, an advertisement regarding a future media presentation. The operations can also comprise determining an identifier of a mobile device and a communication capability of the mobile device; the mobile device is associated with a subscriber to the network, and the subscriber is associated with a remote second media processor communicating over the network. The operations can also comprise establishing communication with the mobile device without using the network and in accordance with the communication capability, and receiving a first signal from the mobile device indicating that recording of an advertised future media presentation is desired. The operations can further comprise displaying on the display device a first menu in response to the first signal, where the first menu comprises future media presentations advertised currently or within a previous time period, the first menu being arranged with a most recently advertised future media presentation at a first position in the first menu and indicated as a default selection. The operations can also comprise receiving a second signal from the mobile device indicating selection from the first menu of a future media presentation to be recorded, and transmitting an instruction via the network to record the selected future media presentation.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716. In an embodiment, subscriber mobile communication device 150 (see FIGS. 1-5) is connected to a cellular network with a base station 717.

Communication system 700 can also provide for all or a portion of the computing devices 730 to function as a media server (herein referred to as server 730). The server 730 can use computing and communication technology to perform, among other things, functions described by method 600 of FIG. 6 (for example, transmitting advertisement 290 for display by media processor 252, and instructing media processor 152 to record the advertised presentation). The media processors 706 and wireless communication devices 716 can be provisioned with software functions to utilize the services of server 730. For instance, functions of media processors 706 and wireless communication devices 716 can be similar to the functions described for media processors 152, 252 and communication device 150 of FIGS. 1-5, in accordance with the method of FIG. 6.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
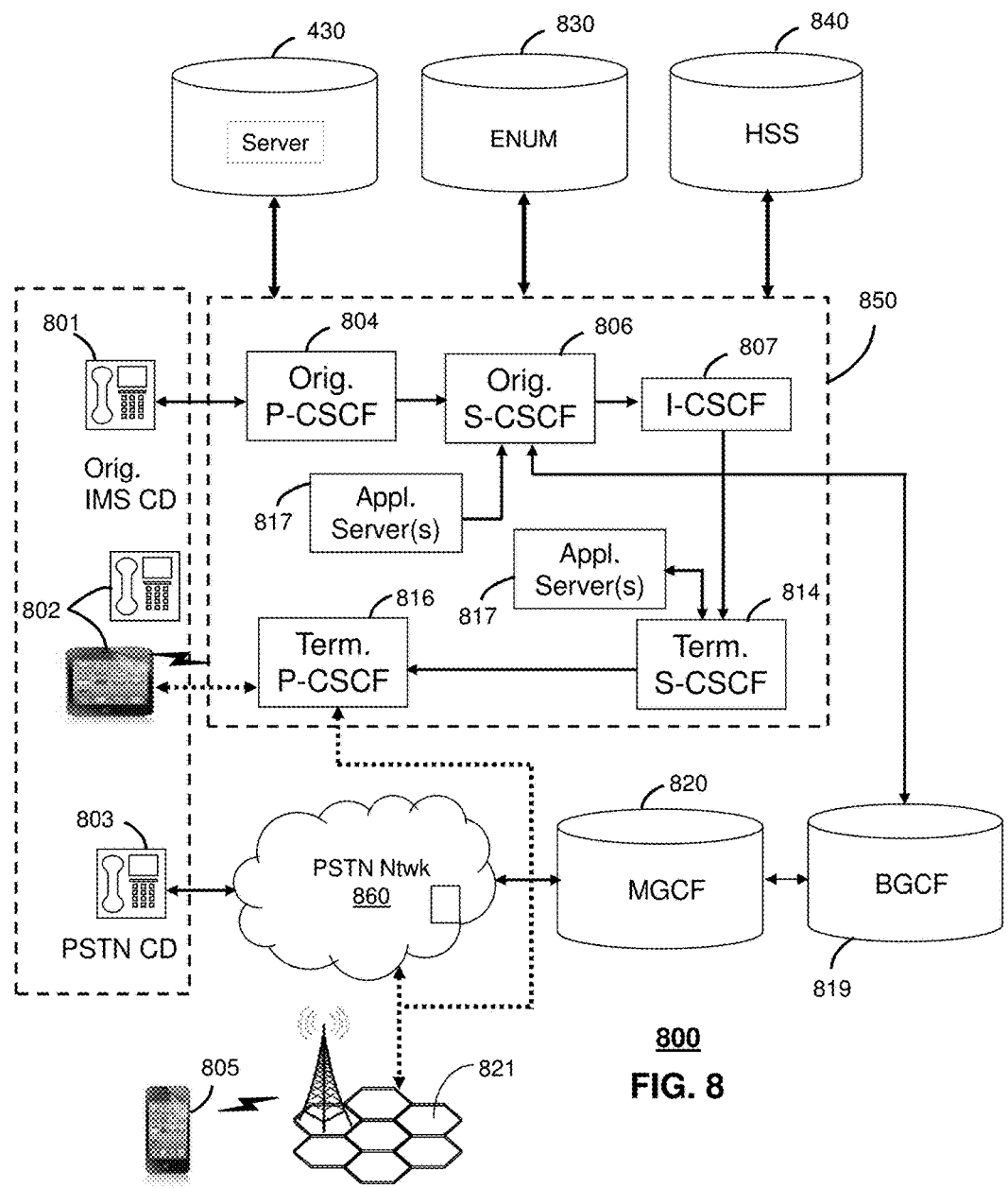

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with communication system 700 as another representative embodiment of communication system 700. In particular, this representative embodiment can perform a method comprising displaying, by a media processor on a display device associated with the media processor, an advertisement regarding a future media presentation, the media processor communicating over a network. The method can also comprise determining, by the media processor, an identifier of a mobile device and a communication capability of the mobile device, the mobile device being associated with a subscriber to the network, the subscriber being associated with a remote second media processor communicating over the network. The method can further comprise establishing communication with the mobile device in accordance with the communication capability, receiving a first signal from the mobile device indicating that recording of an advertised future media presentation is desired, and displaying on the display device a first menu in response to the first signal, where the first menu comprises an identifier of the future media presentation and identifiers of additional future media presentations advertised previously. The method can also comprise receiving a second signal from the mobile device indicating selection from the first menu of a future media presentation to be recorded, and transmitting an instruction via the network to record the selected future media presentation.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 730 of FIG. 7 can be operably coupled to communication system 800 for purposes similar to those described above. CDs 801, 802, 803 and 805 can be adapted with software to utilize the services of the server 730. Server 730 can be an integral part of the application server 817 of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
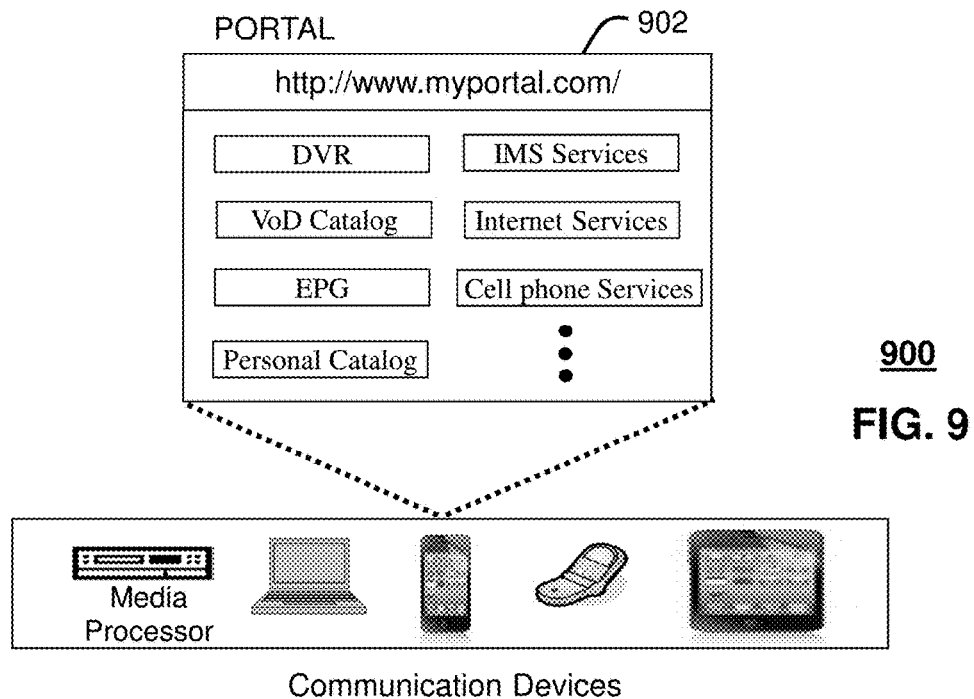
FIG. 9 depicts an illustrative embodiment of a web portal for interacting with the communication systems of FIGS. 7-8.

FIG. 9 depicts an illustrative embodiment of a web portal 902 of a communication system 900. Communication system 900 can be overlaid or operably coupled with communication system 700, and/or communication system 800 as another representative embodiment of communication system 700 and/or communication system 800. The web portal 902 can be used for managing services of the systems shown in FIGS. 1-5 and communication systems 700-800. A web page of the web portal 902 can be accessed by a Uniform Resource Locator (URL) with an Internet browser using an Internet-capable communication device such as those described in FIGS. 1-5 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

Figure 10:
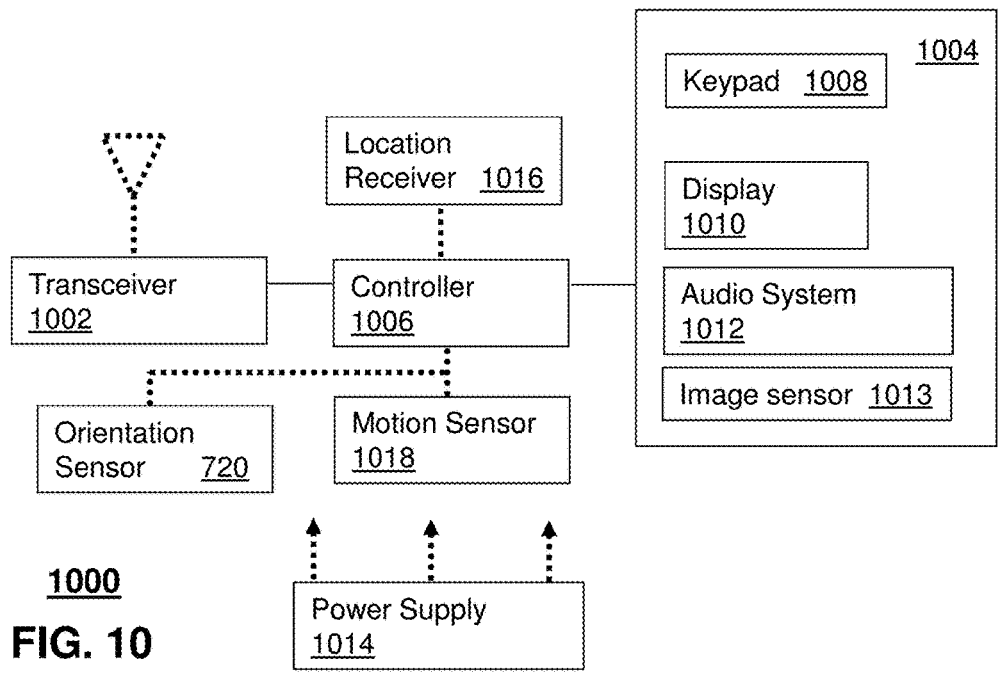
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIGS. 1-5 and FIGS. 7-8. Communication device 1000 in whole or in part can represent any of the communication devices described in FIGS. 1-5, in particular the communication device 150 associated with requesting subscriber 15.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 720, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 720 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of media processors 152, 252 and mobile device 150 of FIGS. 1-5, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in communication systems 700-800 of FIGS. 7-8 such as a gaming console and a media player.

Upon reviewing the aforementioned embodiments, it would be evident to an artisan with ordinary skill in the art that said embodiments can be modified, reduced, or enhanced without departing from the scope of the claims described below. For example, media processor 252 can determine, from subscriber information on device 150, the home geographical location of visiting subscriber 15. Media processor 252 can then determine the correct presentation time of the selected future presentation, to ensure that recording by the requesting subscriber's media processor 152 begins at the correct time. In an embodiment, advertisement 290 includes metadata regarding a scheduled time for presentation at various locations (which may differ between headend offices delivering media content, or because premises 10 and 20 are in different time zones). In another embodiment, media processor 252 can query the media content provider regarding the scheduling and availability of the selected future presentation at the selected location. If visiting subscriber 15 selects a future presentation that will not be available at the visiting subscriber's media processor 152, media processor 252 can schedule a local recording of the selected future presentation, store the recording in local storage (e.g. storage 255) or at a network element, and direct the recording to media processor 152 afterward at a convenient time. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
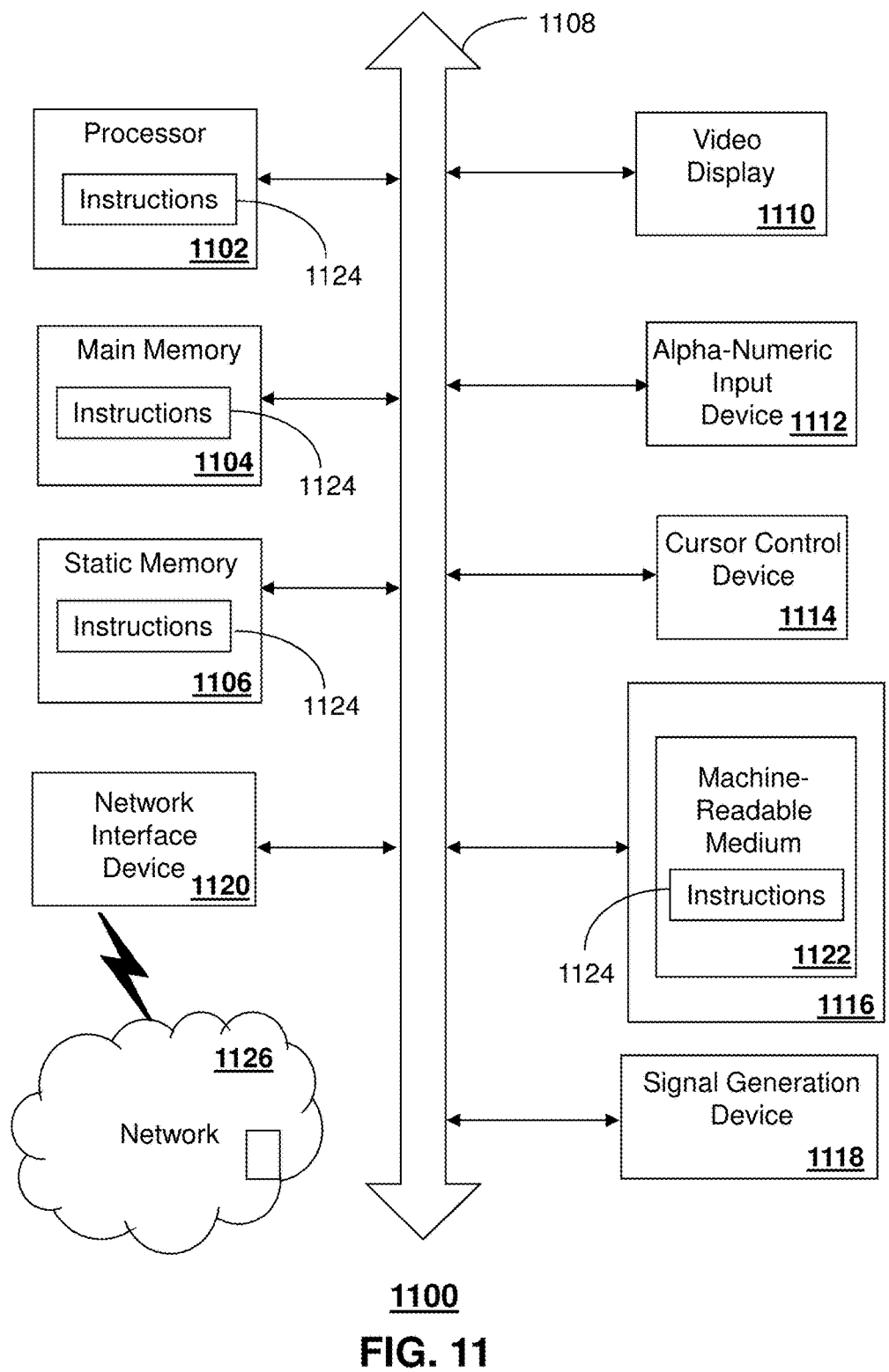
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 730, the media processor 706, the media processors 152, 252, and other devices of FIGS. 1-5. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores instructions that, when executed by the processing system, facilitate performance of operations comprising:
   displaying, on a display device associated with a first media processor communicating over a network, an advertisement regarding a media presentation, wherein the first media processor and the display device are located at a first premises;
   determining an identifier of a mobile device and a communication capability of the mobile device, the mobile device being associated with a network subscriber visiting the first premises, the subscriber being associated with a second media processor communicating over the network, wherein the second media processor is located at a second premises remote from the first premises,
   initiating communication with the mobile device using short-range communication and in accordance with the communication capability;
   receiving a first signal from the mobile device indicating that recording of a media presentation is desired;
   providing a first menu in response to the first signal, wherein the first menu comprises the advertised media presentation, the first menu being arranged with the advertised media presentation at a first position in the first menu and indicated as a default selection;
   receiving a second signal from the mobile device indicating selection from the first menu of a media presentation to be recorded;
   providing a second menu in response to the second signal, wherein the second menu comprises identifiers of a plurality of media processors communicating over the network, the plurality of media processors including the first media processor and the second media processor, the second menu being arranged with the second media processor at a first position in the second menu and indicated as a default selection; and
   transmitting an instruction via the network to record the selected media presentation at the second media processor,
   wherein the first menu and the second menu are provided to the mobile device for presentation at a user interface of the mobile device, and wherein the first menu and the second menu are not displayed at the display device.

2. The device of claim 1, wherein the operations further comprise:
   receiving a third signal from the mobile device indicating selection from the second menu of a third media processor for recording the selected media presentation,
   wherein the transmitting further comprises transmitting the instruction via the network to the third media processor to record the selected media presentation.

3. The device of claim 1, wherein the operations further comprise formatting the first menu and the second menu for presentation at the user interface of the mobile device.

4. The device of claim 1, wherein the determining further comprises determining that the communication capability of the mobile device comprises communicating via a Bluetooth connection.

5. The device of claim 1, further comprising:
   retrieving from a data storage device the identifiers of the plurality of media processors for display in the second menu.

6. The device of claim 5, further comprising:
   receiving from the mobile device an identifier of a media processor for display in the second menu.

7. The device of claim 1,
   wherein the transmitting further comprises transmitting the instruction via the network to the second media processor to record the selected media presentation in the absence of receiving a signal within a predetermined time period in response to providing the second menu.

8. The device of claim 1, wherein the first signal is received after conclusion of the displaying of the advertisement.

9. A non-transitory machine-readable storage medium comprising executable instructions that, when executed by a processing system including a processor, facilitate performance of operations comprising:
   displaying, on a display device associated with a first set top box utilizing the processor, an advertisement regarding a media presentation, the first set top box being associated with a first subscriber and located at a first premises;
   obtaining an identifier of a mobile device, the mobile device being associated with a second subscriber visiting the first premises, the second subscriber being associated with a second set top box located at a remote second premises and not the first set top box,
   initiating communication with the mobile device using short-range communication;
   receiving a first signal from the mobile device indicating that recording of a media presentation is desired;
   providing a first menu in response to the first signal, wherein the first menu comprises the advertised media presentation;
   receiving a second signal from the mobile device indicating selection from the first menu of a media presentation to be recorded;
   providing a second menu in response to the second signal, wherein the second menu comprises identifiers of a plurality of set top boxes including the first set top box and the second set top box; and
   transmitting an instruction to record the selected media presentation at the second set top box,
   wherein the first menu and the second menu are provided to the mobile device for presentation at a user interface of the mobile device, and wherein the first menu and the second menu are not displayed at the display device.

10. The non-transitory machine-readable storage medium of claim 9, wherein the obtaining further comprises determining that a communication capability of the mobile device comprises communicating via a Bluetooth connection.

11. The non-transitory machine-readable storage medium of claim 9, wherein the plurality of set top boxes communicate over a network, wherein the second menu is arranged with the second set top box at a first position in the second menu and indicated as a default selection; and wherein the operations further comprise receiving a third signal from the mobile device indicating selection from the second menu of a third set top box for recording the selected media presentation, wherein the transmitting further comprises transmitting the instruction via the network to the third set top box to record the selected media presentation.

12. The non-transitory machine-readable storage medium of claim 9, further comprising:

retrieving from a data storage device the identifiers of the plurality of set top boxes for display in the second menu.

13. The non-transitory machine-readable storage medium of claim 9, wherein the plurality of set top boxes communicate over a network, wherein the second menu is arranged with the second set top box at a first position in the second menu and indicated as a default selection, and wherein the transmitting further comprises transmitting the instruction via the network to the second set top box to record the selected media presentation in the absence of receiving a signal within a predetermined time period in response to providing the second menu.

14. The non-transitory machine-readable storage medium of claim 9, wherein the transmitting further comprises transmitting the instruction to the second set top box.

15. A method comprising:

displaying, by a processing system, on a display device associated with a first media processor, an advertisement regarding a media presentation, the first media processor being associated with a first subscriber and located at a first premises;

determining, by the processing system, an identifier of a mobile device, the mobile device being associated with a second subscriber different from the first subscriber, the second subscriber visiting the first premises and being associated with a second media processor located at a second premises remote from the first media processor, initiating, by the processing system, communication with the mobile device using a short-range communication protocol;

receiving, by the processing system, a first signal from the mobile device regarding recording of a media presentation;

providing, by the processing system, a first menu in response to the first signal, wherein the first menu comprises an identifier of the advertised media presentation;

receiving, by the processing system, a second signal from the mobile device indicating selection from the first menu;

providing, by the processing system, a second menu in response to the second signal, wherein the second menu comprises identifiers of a plurality of media processors including the first media processor and the second media processor; and transmitting, by the processing system, an instruction to record the selected media presentation at the second media processor, wherein the first menu and the second menu are provided to the mobile device for presentation at a user interface of the mobile device, and wherein the first menu and the second menu are not displayed at the display device.

16. The method of claim 15, further comprising formatting, by the processing system, the first menu and the second menu for presentation at the user interface of the mobile device.

17. The method of claim 15, wherein the plurality of media processors communicate over a network, and further comprising:

receiving, by the processing system, a third signal from the mobile device indicating selection from the second menu of a third media processor for recording the selected media presentation, wherein the transmitting further comprises transmitting the instruction to the third media processor to record the selected media presentation.

18. The method of claim 17, further comprising:

retrieving, by the processing system, from a data storage device the identifiers of the plurality of media processors for display in the second menu.

19. The method of claim 15, wherein the plurality of media processors communicate over a network, and wherein the second media processor is indicated in the second menu as a default selection.

20. The method of claim 15, further comprising:

transmitting, by the processing system, the identifier of the mobile device to a network element; and receiving, by the processing system, from the network element identifiers of the plurality of media processors.

\* \* \* \* \*